United States Patent
Hiebert et al.

[11] 3,718,267
[45] Feb. 27, 1973

[54] ARTICLE STACKING MACHINE

[76] Inventors: Adoniram C. Hiebert, 3007 Innerdale Court, Randallstown, Md. 21133; Richard E. Lowry, 1823 Swansea Road, Baltimore, Md. 21214

[22] Filed: March 16, 1971

[21] Appl. No.: 124,669

Related U.S. Application Data

[63] Continuation-in-part of Ser. No. 821,234, May 2, 1969, abandoned.

[52] U.S. Cl.............214/6 FA, 198/158, 214/8.5 A, 214/8.5 F
[51] Int. Cl.............................................B65g 57/14
[58] Field of Search..........214/6 DK, 6 FA, 6 H, 6 P; 198/163, 158, 164

[56] References Cited

UNITED STATES PATENTS

| | | | |
|---|---|---|---|
| 2,010,732 | 8/1935 | Mandusic | 214/6 FA X |
| 3,458,058 | 7/1969 | Faerber | 214/6 FA |
| 2,919,821 | 1/1960 | Young | 214/6 FA |
| 1,440,716 | 1/1923 | Bliss | 214/6 FA X |
| 2,669,342 | 2/1954 | Neal | 198/164 |
| 2,413,979 | 1/1947 | Lamb | 214/6 FA |
| 2,637,450 | 5/1953 | Eshelman | 214/6 FA |
| 3,124,059 | 3/1964 | Labombarde | 214/6 DK |
| 2,984,838 | 5/1961 | Parker | 214/6 DK |
| 2,924,342 | 2/1960 | St. Jean et al. | 214/6 FA |
| 2,315,003 | 3/1943 | Martin et al. | 214/6 DK |

*Primary Examiner*—Robert J. Spar
*Attorney*—Oblon, Fisher & Spivak

[57] ABSTRACT

An article stacking machine including a pair of continuously moving horizontally spaced vertically extending conveyors having a plurality of hingedly mounted article supports, a feeding conveyor for moving articles one at a time to a position above the vertically disposed conveyors and therebetween, a pair of pivotally mounted plate members for receiving the articles one at a time from the feeding conveyor and lowering the articles one at a time onto the article support members of the vertically disposed conveyors, a supporting structure between the vertically disposed conveyors and at the lower portion thereof for holding a stack base support member thereon during the stacking process, and an automatic pushing element for moving a formed stack from between the vertically disposed conveyors and simultaneously replacing the formed stack with an empty stack base support member while said vertically extending conveyors continuously receive articles and continuously move the articles toward the stack base support member.

8 Claims, 18 Drawing Figures

PATENTED FEB 27 1973

INVENTORS
ADONIRAM C. HIEBERT
RICHARD E. LOWRY

BY  Oblon, Fisher & Spivak

ATTORNEYS

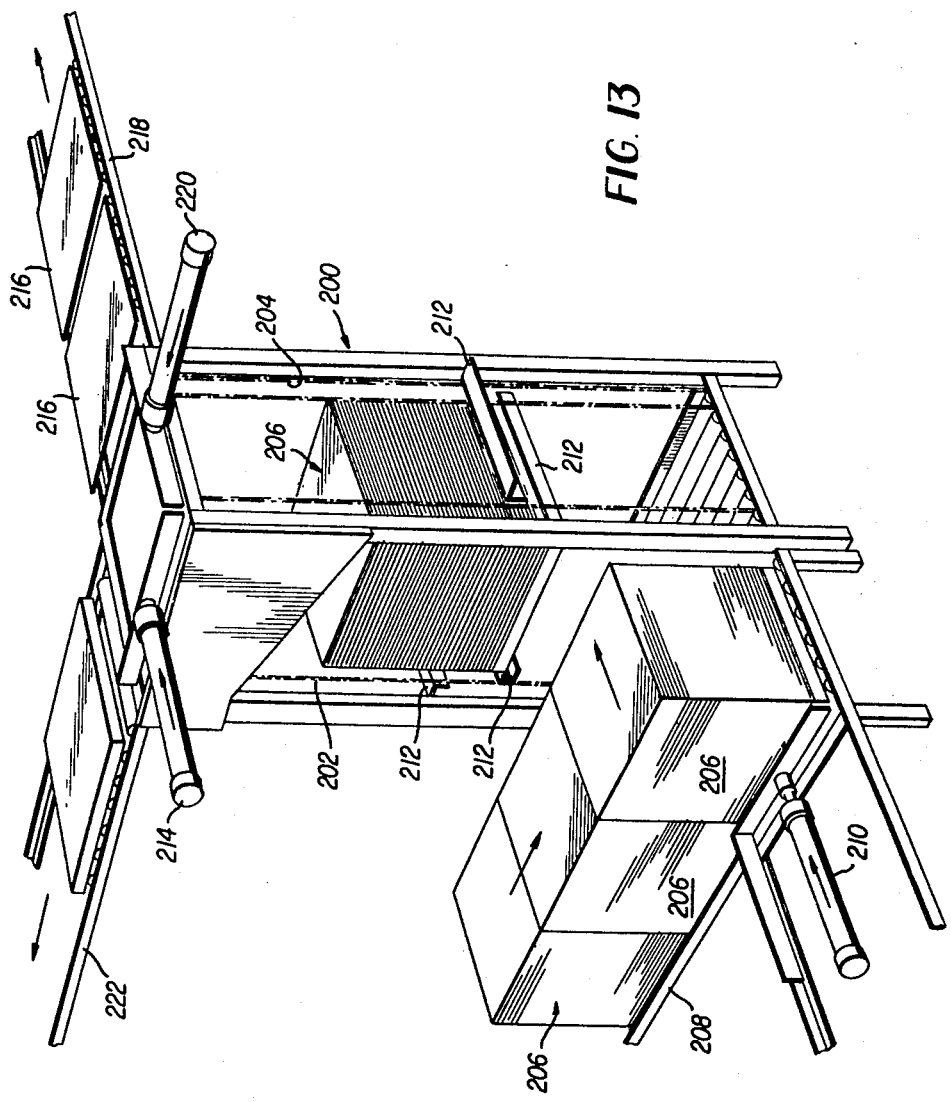

ARTICLE STACKING MACHINE

This application is a continuation-in-part of copending application Serial Number 821,234, filed May 2, 1969 to the same inventors, now abandoned.

BACKGROUND OF THE INVENTION

The present invention relates to improvements in article stacking machines and, in one particular aspect, to a novel and improved stacking machine which is capable of automatically stacking a plurality of articles fed thereto by conventional conveying equipment and which is readily adaptable for accommodating articles having diverse dimensional characteristics.

Modern manufacturing, processing and packaging techniques for the diverse and complicated products presently being produced and those to be produced in the future have created a clear demand for the utilization of assembly line techniques and the birth of the age of automation. It has become increasingly more important to have modern automatic equipment which utilizes a minimum amount of space and which is capable of reducing the amount of personnel usually necessary for performing such functions and which readily performs various functions at high speed with good accuracy previously unattainable by the use of personnel to perform the same or similar functions.

One of the major advanced made in the field of automation has been in the development and manufacture of various types of machinery which had the capacity for automatically handling articles of manufacture during the various processing, packaging and shipping steps necessary for the rapid and efficient production of articles of manufacture which are being produced at an increasingly rapid rate and in increasingly enlarged quantities. To efficiently handle such articles of manufacture during the processing, packaging and shipping procedures it has become a virtual necessity to stack and unstack raw materials, intermediate products, sheet materials, completed articles of manufacture, shipping containers, packages, and the like. Such stacking and unstacking procedures have in the past been done largely as a manual step requiring the constant attention of numerous employees whose time and efforts could be better used elsewhere. Furthermore, it is often impossible or impracticable for said employees to devote sufficient time to stacking and unstacking procedures to do the work with any great amount of precision. Manual stacking and unstacking invariably results in non-uniform, crooked and unbalanced stacks. A further almost unavoidable result of manual stacking and unstacking is the high incidence of breakage of the articles of manufacture.

Prior art machines and mechanisms have long been well known for performing stacking and unstacking functions. Such prior art attempts have achieved varying degrees of success, but none of the prior art attempts have been fully capable of satisfying the great variety of needs of modern material handling, in that they are generally designed to perform one specific function within a particular manufacturing process. Such machines have generally been limited to the handling of only certain articles having the same dimensional and weight characteristics and have presented the further disadvantages of being complex, cumbersome, difficult to assemble and dis-assemble, require large amounts of valuable manufacturing space, have not been fully capable of accurately forming stacks of uniform height and other dimensional characteristics, and have been generally incapable of handling delicate materials, such as tile, slate, asphalt, ceramics, and the like, without intolerable amounts of breakage. Many such prior art devices are incapable of fully automatic operation, and although reducing the number of personnel necessary to perform the desired stacking and unstacking functions, such machines have necessitated the use of several employees to successfully operate when such employees could much more fruitfully be utilized elsewhere. Many such prior art machines have required separate machines or mechanisms of complex structure and undesirably large size for feeding the articles to the machine and for discharging the articles from the machine. Virtually none of the prior art devices had in any way been adjustable so as to accommodate various articles having diverse dimensional weight characteristics. One further disadvantage of those devices known to the prior art are that they generally require complex mechanisms and systems for the control thereof, which systems and mechanisms inevitably decrease the reliability of the overall machines, increase the probability of the machines breaking down, and increase the number of hours necessary for ordinary maintenance and repairs. A still further disadvantage of prior art devices is that it is necessary to run such devices intermittently to enable completed stacks to be removed thus creating a general slowdown of the operation and increasing the chances of a jam in the stacking operation.

SUMMARY OF THE INVENTION

Accordingly, it is one of the objects of the present invention to provide novel and improved stacking and unstacking units of low-cost manufacture which may be assembled with relative ease in a minimum amount of space and which is capable of rapid and precise operation.

Another object of the invention is the provision of a new and improved stacking machine which is capable of being adjusted to accommodate articles of diverse dimensional characteristics.

It is a further object to provide a machine for automatically stacking a plurality of articles in a smooth and continuous manner such that the articles are not damaged during the stacking operation.

Still a further object of the present invention is the provision of a new and improved machine for automatically and continuously stacking a plurality of articles which is capable of receiving the articles from a conventional conveying system, forming a stack of the articles and automatically replacing a stack of the desired height with an empty stack base supporting member without the assistance of an operator.

By way of a summary account of practice of this invention in one of its aspects, a machine for automatically stacking a plurality of articles is provided with a pair of continuously moving horizontally spaced vertically extending conveyors, a driving mechanism for simultaneously moving the conveyors at the same velocity, a support for the stack base member positioned between the conveyors at the lower portion thereof, a mechanism for continuously feeding the articles one at a time to a position above the conveyors, and a mechanism for receiving the articles from the feeding mechanism and for lowering the articles onto the conveyors.

BRIEF DESCRIPTION OF THE DRAWINGS

Although the features of this invention which were considered to be novel are set forth in the appended claims, further details as to preferred practices as to the further objects and features thereof may be most readily comprehended to reference to the following description taken in connection with the accompanying drawings, wherein:

FIG. 13 is a schematic perspective view of the unstacking machine of the present invention;

DESCRIPTION OF THE PREFERRED EMBODIMENT

Figure 1:
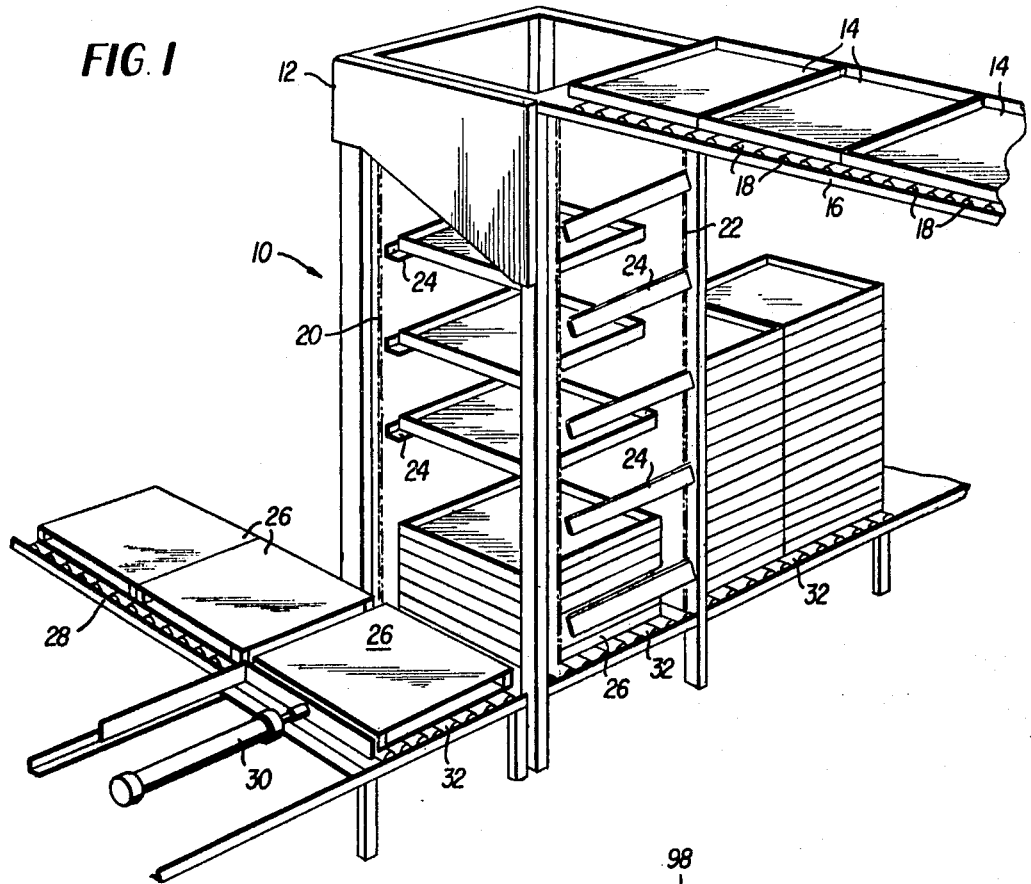
FIG. 1 is a perspective view in schematic form, with parts not shown, illustrating the operative steps of the stacking machine of the present invention.

Referring now to the drawings wherein like reference characters designate identical or corresponding parts throughout the several views, and more particularly in FIG. 1 thereof wherein is shown in a schematic manner the article stacking machine of the present invention with the stacking portion of the machine indicated generally by the reference numeral 10. The entire machine structure is supported by conventional frame members, such for example as I-beams, U-beams, angle irons, and the like. Covering materials of plywood, sheet metal, and the like, such as illustrated at 12, may be utilized, without interfering with the functional operation of the article stacking machine of the present invention.

The articles 14 to be stacked are conveyed by a conventional conveying mechanism 16 to a position above the stacking structure 10. The feeding conveyor structure 16 in one illustrative embodiment, includes a plurality of rollers 18 which are driven by a belt-type conveyor, not shown on the top or underside surface thereof in conventional manner. The articles 14 when positioned above the structure 10 are lowered into the mechanism by a device to be more fully described hereinafter. A pair of conveyors 20 and 22 having article supporting members 24 hingedly mounted thereto are provided for moving the articles one at a time in a downward direction until such articles come to rest upon the top of the stack being formed therebelow. A stack base supporting member 26 is provided between the conveyors 20 and 22 at the lower portion thereof for receiving the articles being conveyed downwardly, such that the stack is formed atop the base member 26. Obviously, if the articles are of sufficient strength and rigidity, the base members 26 can be eliminated. A conventional conveying mechanism 28, of similar structure to the conveying mechanism 16 is provided for moving a plurality of stack supporting base members 26 to a position adjacent the stacking device 10. When the stack has reached a pre-selected desired height, a fluid operated pushing element 30 of the piston-cylinder type moves an empty base supporting member 26 between the conveyors 20 and 24 and simultaneously moves the completed stack to the rear of the stacking mechanism by means of a plurality of rollers 32. Any conventional mechanism, such as a solenoid operated switch, a photo-electric cell, and the like, may be utilized for detecting when the stack has been completed for actuating the pusher element 30. The completed stacks may be transferred by conventional conveying mechanisms to further stations to be processed, packaged, shipped, or stored. As can be easily seen from reviewing the schematic representation in FIG. 1, the entire operation of the stacking machine is fully automatic and does not require the valuable time and efforts of employees. It is to be further noted that the stacking operation is completely versatile and may be readily assembled in a minimum amount of space at virtually any location within the manufacturing facilities.

Figure 2:
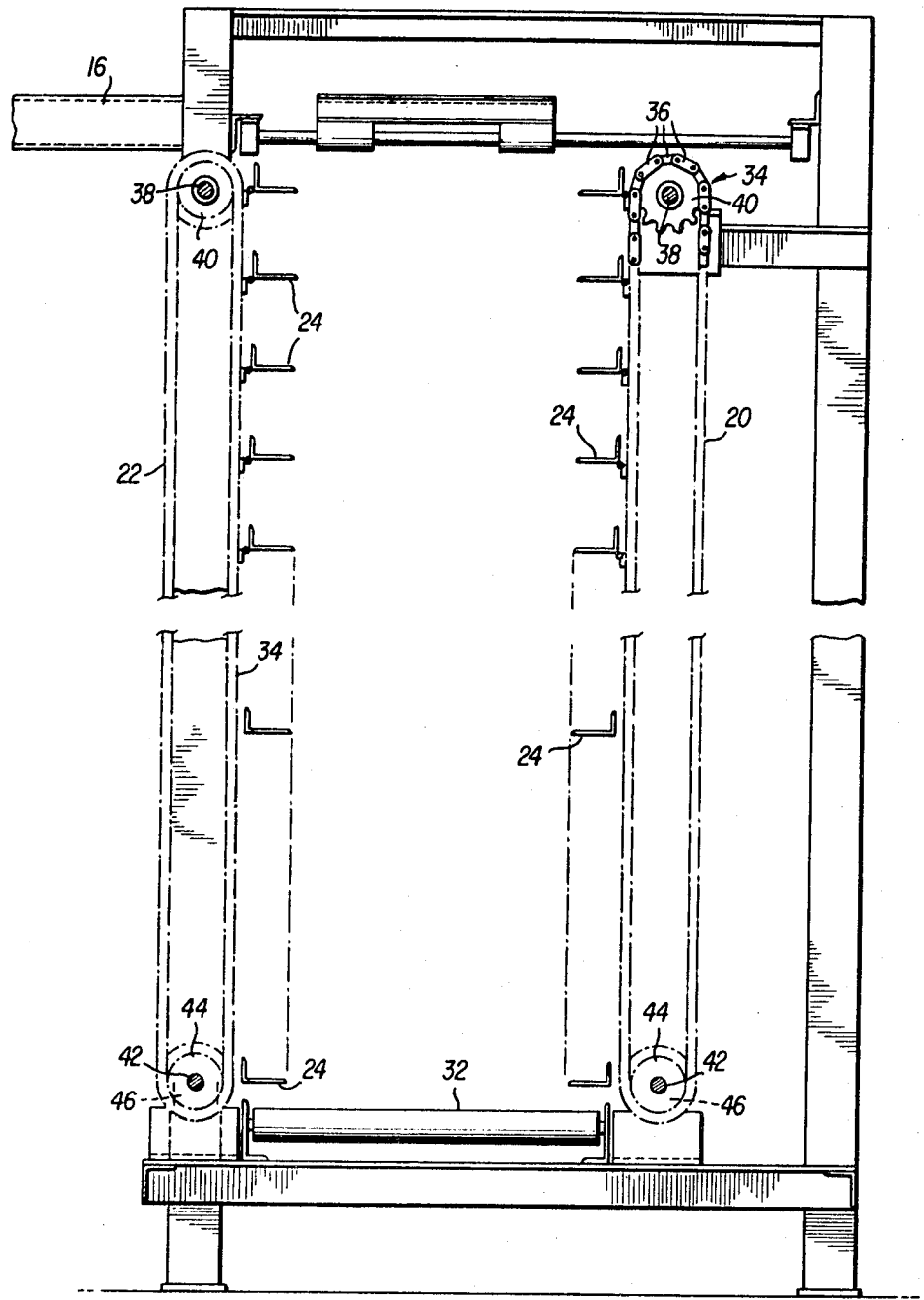
FIG. 2 is a plan sectional view, with parts not shown, in schematic form illustrating the back portion of the stacking machine of the present invention.
Figure 3:
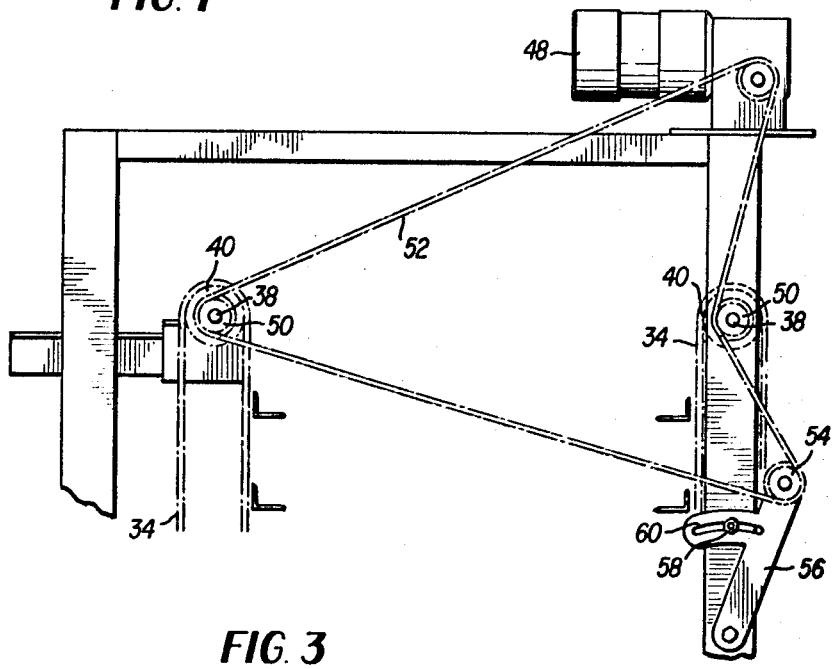
FIG. 3 is a plan view, with parts not shown, illustrating the drive mechanism for the conveyors of the stacking machine of the present invention.
Figure 4:
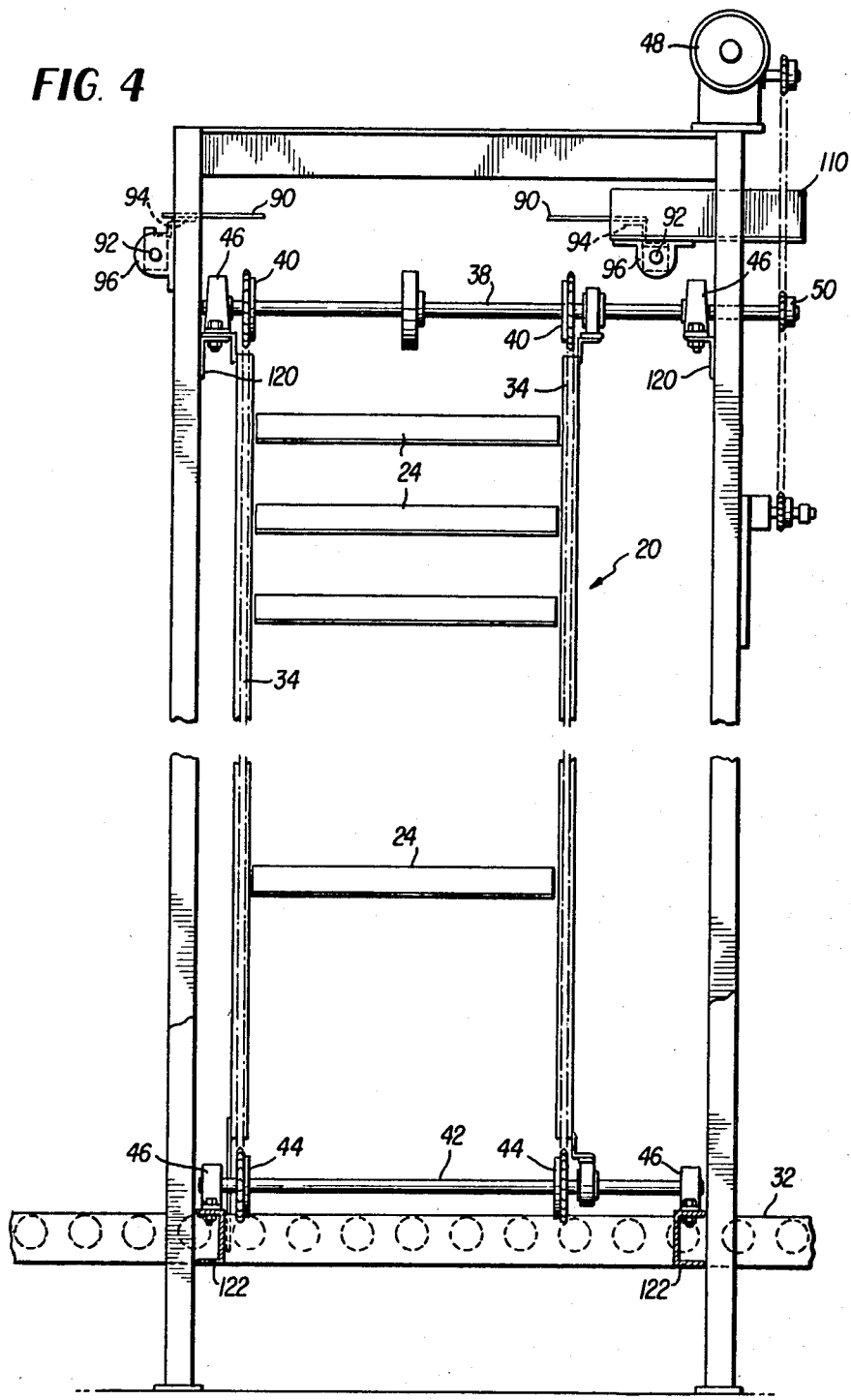
FIG. 4 is a plan side view, with parts cut away, illustrating a portion of the functional elements of the stacking machine of the present invention.

Referring now to FIGS. 2, 3 and 4, the horizontally spaced vertically extending conveyors 20 and 22 are illustrated as each including a pair of spaced closed loop chains 34 which form a continuous pad and wherein each of the chains 34 is constructed of a plurality of flexibly interconnected lengths 36 of conventional construction. A pair of upper horizontally extending shafts 38 are each provided with a pair of pinion gears 40 which are in driving engagement with the chains 34. A pair of lower horizontally extending shafts 42 are similarly provided with a pair of pinion gears 44 which are in driving engagement with the lower portions of the chains 34. Each of the shafts 38 and 42 are mounted in conventional bearing structures 46 for rotation therein. Extending between the corresponding chains 34 of each of the conveyors 20 and 22 are the article supporting members 24 which preferably are evenly spaced about the entire outer surface of the chains 34. As more clearly seen in FIGS. 4 and 5, the sprockets or pinions 40 are driven in a counter-rotating manner at the same velocity by means of a driving motor 48. Gears 50, on the forward terminal portion of shafts 38 are engaged by a sprocket chain 52 which is driven by loader 48. The chain engages gear 50 associated with conveyor 22 at the outer portion thereof and engages gear 50 associated with conveyor 20 at the inner portion thereof such that the inner flights of the conveyors will both move in a downward direction at the same velocity. An idler gear 54 is provided on an adjustable tightening bracket 56 for maintaining chain 52 in the position shown in FIG. 3. Bracket 56 may be adjusted by means of bolt 58 extending through a slot 60 therein such that the chain 52 is maintained in a taut condition.

Figure 5:
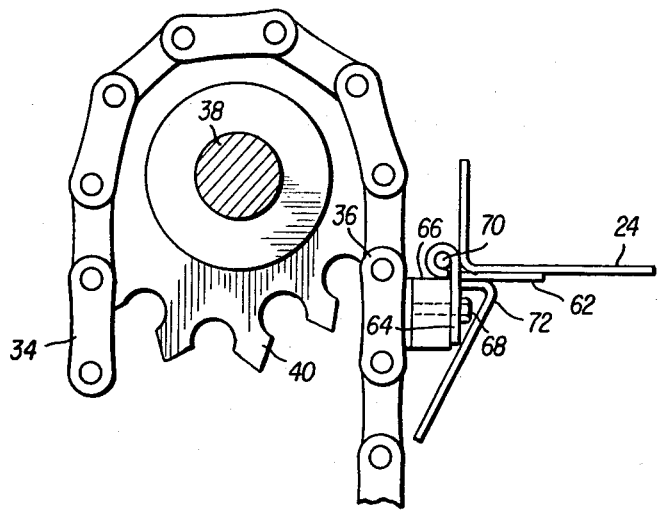
FIG. 5 is an exploded view of the conveyor and article support.
Figure 6:
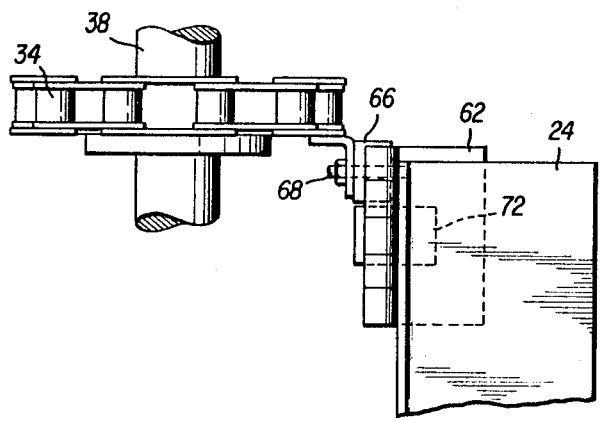
FIG. 6 is an exploded top plan view of the conveyor elements of FIG. 5.

As more clearly shown in FIGS. 4, 5 and 6, the article supporting members 24 are secured to one leaf 62 of a hinge by conventional means, such as welding. The other leaf 64 of the hinge is secured to a link 36 of the chain 34 through a bracket 66 by conventional means, such as bolt 68. Leaves 62 and 64 are rotatably by means of hinge pin 70 in the conventional manner. A stop member 72 is secured to leaf 64 by conventional means, such as welding such that leaf 62 is maintained in a horizontal position during at least a portion of the downward movement of chain 34. Since leaf 62 engages stop 72 to be maintained in a horizontal position, it can readily be seen that the article support members 24 will likewise be maintained in a horizontal position during the same portion of the flight of the conveyor. Stop 72 further acts as a stack alignment guide since it will engage an article therebelow to push the article in alignment with the stack should the article have moved out of position.

Figure 7:
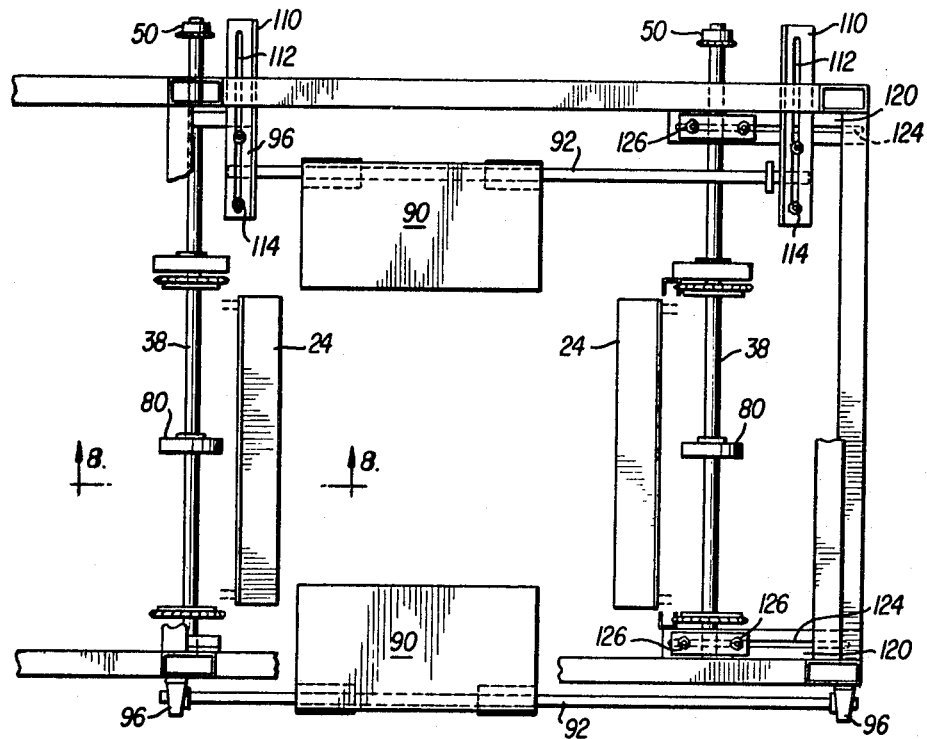
FIG. 7 is a top plan view, with parts broken away, of the stacking machine of the present invention.
Figure 8:
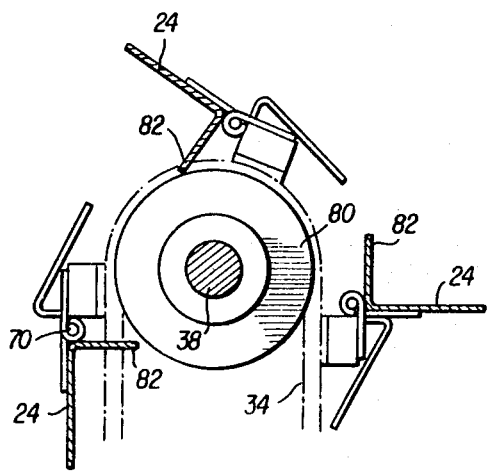
FIG. 8 is an exploded sectional view taken along the lines 8—8 of FIG. 7.

A turnover mechanism 80 in the form of a wheel is secured to the central portion of shafts 38, as shown in FIGS. 7 and 8, for assuring that support members 24 are maintained in the horizontal position during the upper portion of the downward flight of the conveyors. With an article supported between the conveyors 20 and 22 and resting on corresponding support members 24, the article will be lowered to a position wherein it engages the top of the stack being formed at the lower portion of the conveyors. At such time as the article engages the stack being formed, article support members 24 will likewise engage the top of the stack and will be pivoted upwardly to a substantially vertical position such that the article will come to rest atop the stack as the article support members continue downwardly. The article support members 24 will be retained in the vertical position during the remainder of the downward flight of the conveyors by the engagement with the formed stack, and will likewise be maintained in a substantially vertical position during the upward portion of the flight of the conveyors due to gravity. Upon reaching the top of the upward portion of the flight of the conveyors it is highly desirable to re-position the article support members in the horizontal position such that they are capable of receiving another article to be conveyed downwardly to the top of the stack. A leg member 82 formed integrally with the article support members 24 and extending perpendicularly therefrom is provided for cooperation with wheel 80 at the top of the conveyors 20 and 22 such that the leg member 82 will engage wheel 80 at the top of the upper flight of the conveyors which in turn causes the article support member 24 and integrally formed leg member 82 to rotate about pin 70 until the article support member 24 has come to the horizontal position, as shown in FIG. 8.

Figure 9:
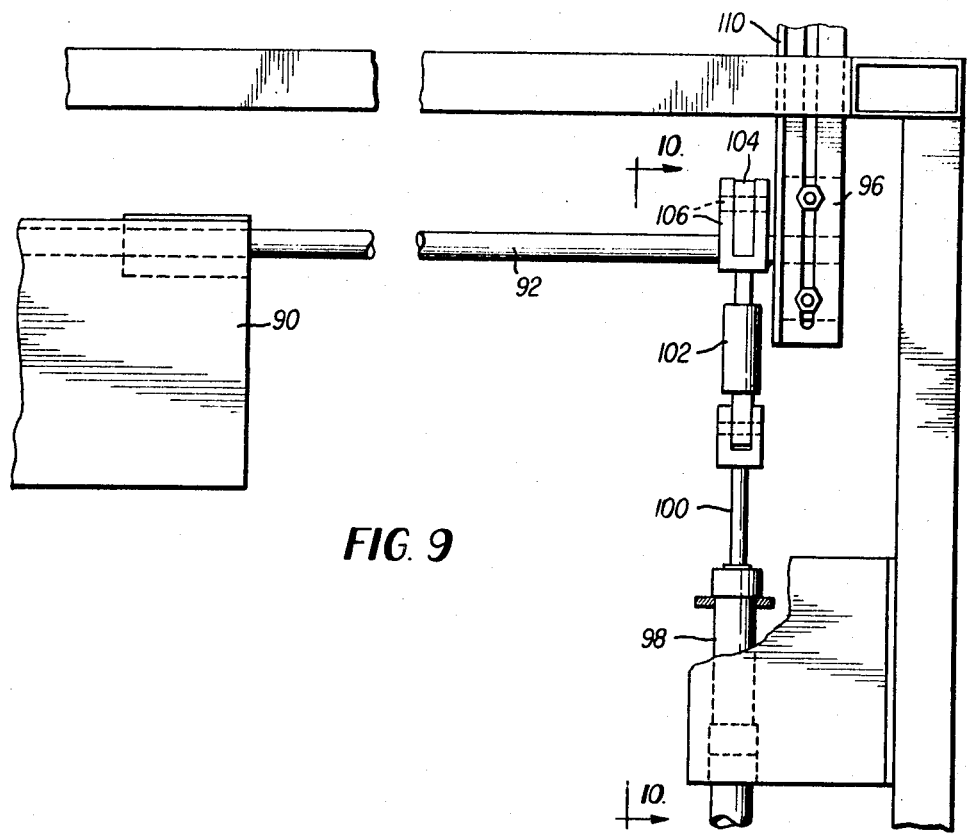
FIG. 9 is a top plan view, with parts broken away, illustrating the operating mechanism for the article lowering device.
Figure 10:
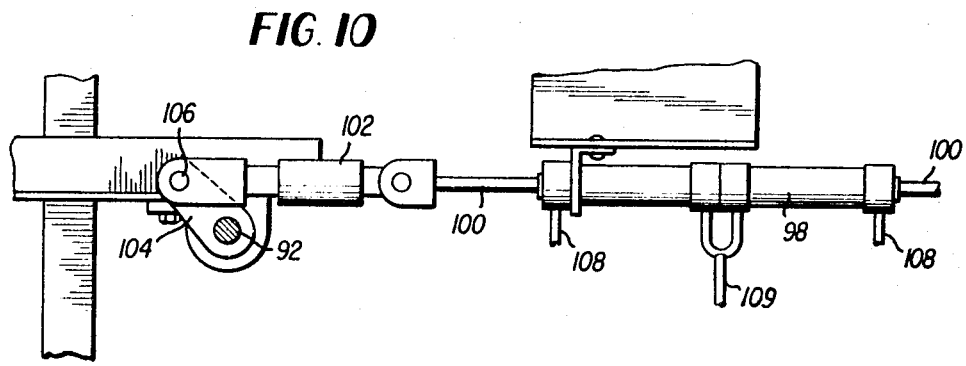
FIG. 10 is a partial sectional view taken along the line 10—10 of FIG. 9.
Figure 11:
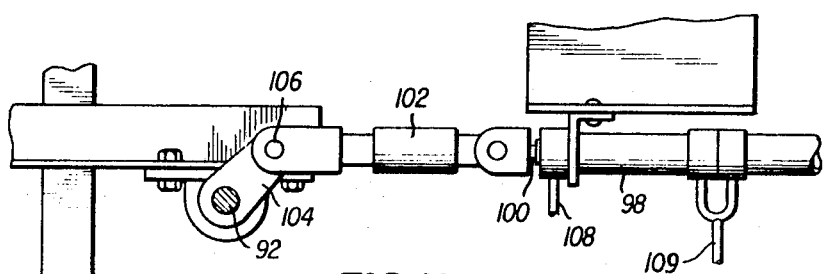
FIG. 11 is a partial sectional view similar to FIG. 10 with the operating mechanism in a second position.

In order to expeditiously transfer the articles to be stacked from the feeding conveyor 16 onto the article supporting members on the conveyors 20 and 22 in a manner which does not cause excess wear or breakage to the articles, a horizontal support is provided above the conveyors which is pivotally mounted for lowering the articles onto the article supports. As was clearly seen in FIGS, 4, 7, 9, 10 and 11, the horizontal support consists of a pair of spaced plate members 90 which are fixedly secured to shafts 92 by an offset bracket 94 of generally Z-shape in a conventional manner, such as by welding. Shafts 92 are mounted at their terminal portions in bearing members 96 for rotation therein. It is necessary to maintain the plate members 90 in the horizontal position shown in FIG. 4, during the period when an article is being conveyed onto the plate members 90 by conveyor 16. Once an article is in position on the plate members 90 it is then necessary to downwardly rotate the plate members in a controlled manner such that the article supported thereon will be lowered between the conveyors 20 and 22 to be deposited upon the uppermost set of article supporting members 24. As seen most clearly in FIGS. 9, 10 and 11 an actuation such as a double piston-cylinder arrangement 98 having piston extensions 100 projecting therefrom provides a fluid operated mechanism for maintaining the plate members 90 in a horizontal position while being loaded and for slowly rotating the plate members in a downward direction. Interconnecting shaft 92 and piston rod 100 is a linkage arrangement including a rod member 102 pivotally mounted to a link 104 through a pin member 106, thus, it can be seen that when fluid has been evacuated from the piston-cylinder arrangement through conduits 108 the piston rod 100 will be extended thus rotating shaft member 92 to the position shown in FIG. 10 wherein the plate members 90 will in a substantially vertical position. Upon the application of fluid pressure to conduits 108, the pistons will receive within the cylinders 98 such that piston rod 100 will be moved to the position shown in FIG. 11, thus rotating shafts 92 through an angle of approximately 90° which will therefore, orient the plate members in a substantially horizontal position.

With the plate members 90 in a fixed position there are obviously certain limitations as to the ability for the plate members to handle articles of varying diverse dimensions. Therefore, a pair of brackets 110 are fixedly secured to the framework of the stacking machine such that bearings 96 are mounted within slots 112 by means of conventional securing elements, such as bolts 114, as clearly shown in FIGS. 7 and 9. In this manner, it can readily be seen that at least one of the plate members 90 is adjustable relative to the other plate member by slidingly adjusting the bearing elements 96 within the slots 112 of brackets 110 such that the plate members are enabled to accommodate articles of varying diverse dimensional characteristics. It is likewise desirable to have the capacity for adjusting the spacing between conveyors 20 and 22 such that the article supporting members 24 will have the capacity to support articles of diverse dimensional characteristics. A pair of brackets 120 are provided at the upper portion of the stacking machine and a corresponding pair of brackets 122 are mounted at the lower portion of the stacking machine, each being of similar design such that the bearing members 46 supporting one of the conveyors, conveyor 20 as shown in the drawings, for movement relative to the other of the conveyors. The bearing structures are mounted to bracket members 120 and 122 by means of a slot 124 formed within the bracket members through which conventional securing members, such as bolts 126 may be attached. It is to be understood that when plate members 90 are to be adjusted relative to each other it is necessary to adjust or replace connecting arms 102 with either a larger or smaller connecting element which will adequately suit the purpose.

Figure 12:
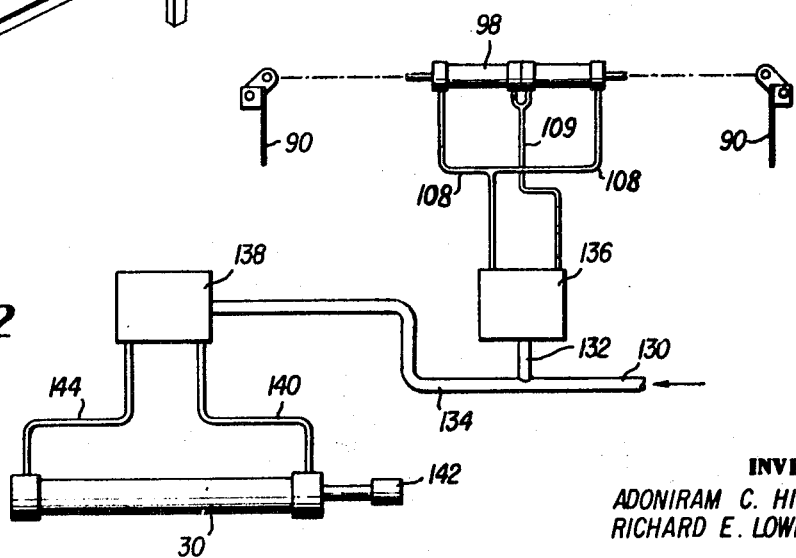
FIG. 12 is a schematic view of the fluid operating mechanisms associated with the present invention.
Figure 14:
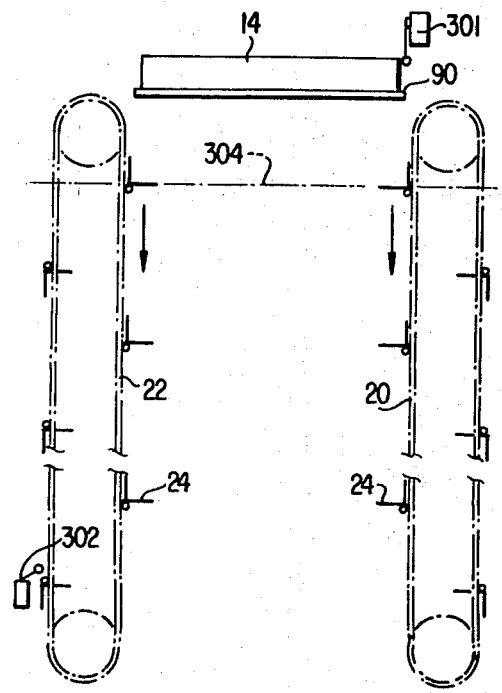
FIG. 14 is a schematic view, with parts broken away, of an operative step of the stacking machine of FIG. 1.

Referring now to FIG. 12, wherein an exemplary fluid operating system is illustrated in a schematic manner, the piston-cylinder arrangement 30 for removing a completed stack as well as the piston-cylinder arrangements 98 for operating the plate members 90 are illustrated as in a common fluid operated system. A constant fluid source 130 communicates with a pair of conduits 132 and 134 to introduce fluid pressure, such a pneumatic or hydraulic pressure to a pair of valve members 136 and 138, each of which may be operated by conventional mechanisms, such as solenoids. Valve member 136 would be considered of conventional design such that in a first position fluid pressure would be introduced through conduit 132 into valve 136 to be distributed into conduits 108 for retracting the pistons within the cylinders 98 to raise the plate members 90 to a horizontal position. In the second position of valve 136 fluid would be exhausted to conduits 108 and pressure vented through conduit 109 thus permitting the plate members 90 to retract to the vertical position. Fluid entering into valve 138 through conduit 134 would be directed to conduit 140 in a first position of the valve to retract the piston 142 and in the second position of valve 138 fluid pressure would be directed to conduit 144 to activate the pushing element 142 such that the pallet 26 would be pushed into the stacking machine or when pallet 26 is not used, the stack would be removed. The continuous operation of the stacking machine of the present invention is most clearly described with reference to FIGS. 14–16. A switch 301, of conventional design, is positioned above the plate members 90 adjacent the far side thereof so as to be activated by an incoming article 14 when the article is in the proper position to be stacked. A second switch 302 is positioned outwardly of one of the vertical conveyors 20 or 22 so as to be activated by a supporting member 24 which would indicate that the supporting member 24 at the top of the downward flight of the conveyors would be in the proper position 304 for receiving an article 14 to be stacked. Once switch 302 has been triggered, the plate members 90 would move to the downward position to deposit the article 14 onto the supporting members 24 when in the proper position 304. The position of switch 302 is adjustable such that the point at which the plates 90 deposit the article on the material handler can be varied. A switch 303 is positioned adjacent the conveyor 22 between the upward and downward flight thereof at an elevation to indicate the top of a completed stack. As the last article 14 to be deposited on the top of the stack begins to come to rest upon the stack, the article supporting members at the sides thereof are swung backward so as to trip the switch 303 indicating the completion of the stack. The shortest possible time T between the triggering of switch 303 and the arrival of the next product to the top of the stack would be equal to the distance D between the article support members 24 divided by the speed of the conveyors 20 and 22 carrying the article support members.

$$T = \frac{\text{Distance between article support members}}{\text{Speed of conveyors carrying article support members}} = \frac{D}{V}$$

Figure 15:
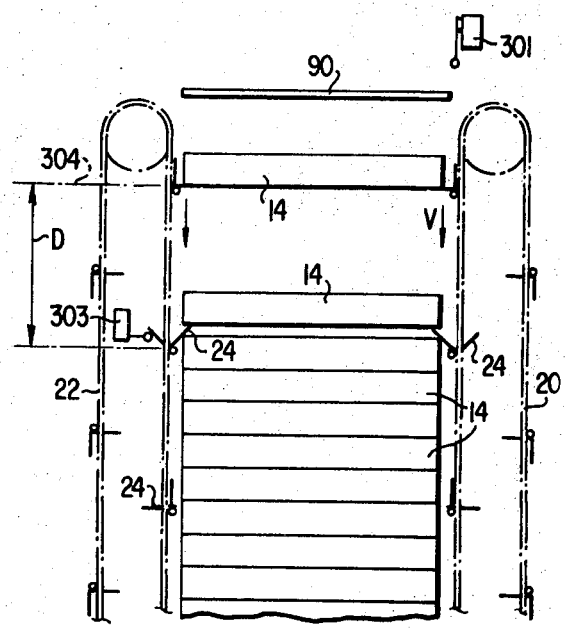
FIG. 15 is a schematic view, with parts broken away, of an operative step of the stacking machine of FIG. 1.

The shortest time that T could occur would be when one article is at point 304, one article on the article handler therebelow and a full stack has been reached (see FIG. 15). In order for the stacking machine to operate continuously, the full stack must be completely pushed out before the article located at point 304 reaches the top of the stack formed in the time $T_2$ where $$T_2 = \frac{D - \text{the thickness of the article}}{V} = \frac{D-t}{V}$$

Figure 16A:
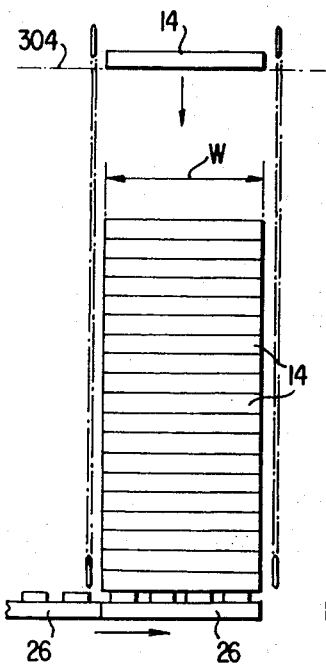
FIG. 16A is a schematic view of a first operative step of the stacking machine.
Figure 16B:
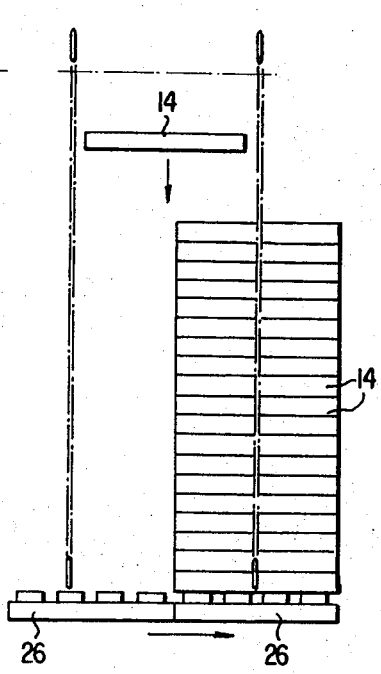
FIG. 16B is a schematic view of a second operative step of the stacking machine.
Figure 16C:
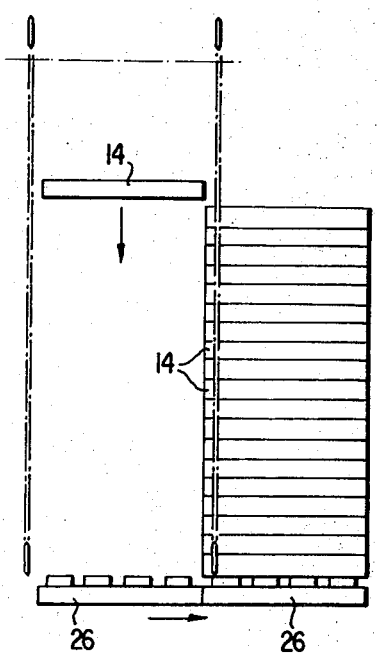
FIG. 16C is a schematic view of a third operative step of the stacking machine of FIG. 1.

In time $T_2$ a stack having a width W, as shown in FIG. 16, must be out of the way of the article at point 304. Assuming the rate of travel of the pushing element to be equal to $V_1$:

$$V_1 = W/T_2$$

but $T_2 = (D-t)/V$ such that $V_1 = WV/(D-t)$. Switch 303 would operate a solenoid valve to actuate the pushing element 142. It can be seen that by properly positioning the switches 302 and 303 a completed stack can be removed from the stacking machine without interrupting the motion of the conveyors 20 and 22 or the plate members 90.

The same basic structure utilized for the stacking operations is also used for unstacking a loaded pallet with some basic modifications. Referring to FIG. 13, the unstacking machine indicated generally by the numeral 200 is of the same basic construction as the stacking machine 10 illustrated in FIG. 1 and those parts of the same or similar structure are therefore not described with relationship to the unstacking machine. For example, conveyors 202 and 204 in the stacking machine and the associated driving mechanisms would be basically the same as conveyors 20 and 22 in the stacking machine 10. In the stacking machine 200 it is to be noted that a plurality of stacks 206 are fed into the stacking machine by conventional conveying equipment 208 and a pushing element of similar construction as the conveying mechanism 28 and pushing element 30 of the stacking machine. The direction of the conveyors 202 and 204 are such that the inner portions of the conveyors form an upwardly moving flight of the conveyors. Article support members 212 are fixedly secured to the conveyor elements in that a hinge mounting is not necessary for the unstacking operations. It is to be further noted that only two sets of article supporting members 212 are utilized in the unstacking machine and the sets are located 180° out of phase. Additional sets of article supporting members can be utilized depending upon the height of the stacks to be formed and the height of the overall stacking machine. As the stack 206 reaches the upper portion of the conveyor elements a conventional piston-cylinder type pushing element 214 is utilized in a reciprocating manner to discharge the articles 216 one at a time onto a roller type conveyor of conventional construction as illustrated at 218 in the drawing. Once all of the articles 216 have been discharged from the stack a second pushing element of conventional construction such as illustrated at 220 in the drawing may be utilized for discharging the pallets or stack supporting members onto a discharge conveyor 222. It is to be noted that any conventional discharging members could be utilized with the unstacking machine of the present invention, and is not intended that the invention be limited to piston type discharging elements. It can therefore be seen that in both the stacking and unstacking operations the machine of the present invention provides a compact, efficient, highly versatile component which may be introduced into a manufacturing plant for performing various stacking and unstacking functions. It is further to be noted that such stacking and unstacking operations performed by the machine of the present invention can be utilized in combination with various other types of mechanisms for combining a plurality of similar articles into a composite structure with the assistance of conventional equipment such for example as stapling apparatus, glue, gluing apparatus and the like.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A machine for automatically stacking a plurality of articles comprising:

a pair of horizontally spaced vertically extending conveyors each comprising a pair of spaced closed loop chains forming a continuous path and constructed of a plurality of flexibly interconnected lengths, upper and lower horizontally extending shafts each having a pair of pinion gears in driving engagement with said chains, a plurality of spaced hinges having one leaf of each hinge secured to one of said chains and the other leaf thereof free to move relative to said securing leaf through an arc greater than 90°, a plurality of article supporting members extending between said chains and secured to the free leaves of a pair of corresponding horizontally aligned hinges on said chains, and stop means secured to the fixed leaf of said hinge for retaining said free leaf and attached article supporting member in a horizontal position during at least a portion of the downward flight of said conveyors;

means for continuously moving said conveyors simultaneously at the same velocity;

means for supporting a stack base member between said conveyors at the lower portion thereof;

means for feeding said articles one at a time to a position above said conveyors;

mean for receiving said articles one at a time from said feeding means and for lowering said articles onto said conveyors such that said vertically extending conveyors continuously move said articles toward said stack base member;

means for automatically removing said stack base member from between said conveyors when a stack of desired height has been formed thereon and for simultaneously positioning an empty stack base member between said conveyors in place thereof while said vertically extending conveyors continuously receive said articles and continuously move said articles toward said stack base member;

means for positioning said article supporting members in a horizontal position at the upper portion of said downward flight of said conveyors;

a leg member integral with and extending from said article supporting members, and wherein said positioning means comprises at least one member affixed to said upper shaft for engagement with said leg members.

2. A machine as set forth in claim 1 wherein said means for receiving said articles from said feeding means and for lowering said articles onto said conveyors comprises:

means for providing a horizontal support for said articles above said conveyors; and means for pivoting said horizontal support means downwardly between said conveyors.

3. A machine as set forth in claim 2 wherein said pivoting means comprises at least one shaft member affixed to at least one segment of said horizontal support means, said shaft member being mounted for rotation within bearing means, and means for rotating said shaft member.

4. A machine as set forth in claim 2 wherein said horizontal support means comprises a pair of spaced plate members, and wherein said pivoting means comprises a pair of shaft members each affixed to one of said plate members, said shaft members being mounted for rotation within bearing means, and means for rotating said shaft members.

5. A machines as set forth in claim 4 wherein said shaft members affixed to said plate members are perpendicular to said horizontally extending shafts of said conveyors.

6. A machine as set forth claim 4 wherein at least one of said pivoting shaft members is adjustably supported so as to be adjusted toward and away from the other of said pivoting shaft members, whereby said horizontal support means is readily adaptable for various size articles.

7. A machine as set forth in claim 3 wherein said means for rotating said shaft member includes a fluid operated piston-cylinder mechanism, and means for linking said piston with said shaft member.

8. A machine as set forth in claim 4 wherein said means for rotating said shaft members includes a pair of fluid operated piston-cylinder mechanisms, and means for linking each of said pistons with a corresponding shaft member.

* * * * *